US008823799B2

(12) United States Patent
Kuehnle et al.

(10) Patent No.: US 8,823,799 B2
(45) Date of Patent: Sep. 2, 2014

(54) METHOD AND SYSTEM FOR EVALUATING BRIGHTNESS VALUES IN SENSOR IMAGES OF IMAGE-EVALUATING ADAPTIVE CRUISE CONTROL SYSTEMS, ESPECIALLY WITH RESPECT TO DAY/NIGHT DISTINCTION

(71) Applicant: Bendix Commercial Vehicle Systems LLC, Elyria, OH (US)

(72) Inventors: Andreas Kuehnle, Villa Park, CA (US); Cathy Boon, Orange, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 13/897,535

(22) Filed: May 20, 2013

(65) Prior Publication Data

US 2013/0251208 A1    Sep. 26, 2013

Related U.S. Application Data

(63) Continuation of application No. 12/674,918, filed as application No. PCT/EP2008/007033 on Aug. 28, 2008, now abandoned.

(60) Provisional application No. 60/966,719, filed on Aug. 28, 2007.

(51) Int. Cl.
*H04N 7/18* (2006.01)
*G06K 9/00* (2006.01)
(52) U.S. Cl.
CPC ........ *G06K 9/00798* (2013.01); *G06K 9/00791* (2013.01)
USPC ........................................... 348/149; 348/148
(58) Field of Classification Search
CPC ................................ G08G 1/0129; B62D 6/00
USPC .................................................. 348/148, 149
See application file for complete search history.

(56) References Cited

U.S. PATENT DOCUMENTS 5,617,141 A    4/1997   Nishimura et al.
6,049,171 A    4/2000   Stam et al.
(Continued)

FOREIGN PATENT DOCUMENTS

DE    102004017890 A1    7/2005
DE    102006055905 A1    5/2008
WO         9832280 A1    7/1998

OTHER PUBLICATIONS

International Search Report with English translation from PCT/EP2008/007033 dated Jul. 28, 2009.

(Continued)

*Primary Examiner* — Sath V Perungavoor
*Assistant Examiner* — Matthew J Anderson
(74) *Attorney, Agent, or Firm* — Calfee, Halter & Griswold LLP

(57) ABSTRACT

The invention proposes a method and an arrangement for evaluating sensor images of an image-evaluating environment recognition system on a carrier, in which, in order to distinguish the light conditions in the area of the image-evaluating environment recognition system with regard to day or night, at least the gain and/or the exposure time of the at least one image sensor detecting the environment is/are monitored, a profile of the gain and/or the exposure time against time with relatively high gain or relatively long exposure times characterizing night-time light conditions, and a profile of the gain and/or the exposure time with relatively low gain and/or relatively short exposure times characterizing daytime light conditions. The environment recognition system according to the invention can also be used to search the detected environment for bright objects, the headlights of another carrier being used as additional information, for example.

20 Claims, 2 Drawing Sheets

(56) References Cited

U.S. PATENT DOCUMENTS

| | | | |
|---|---|---|---|
| 6,362,848 B1 | 3/2002 | Lohscheller et al. | |
| 6,379,013 B1 | 4/2002 | Bechtel et al. | |
| 6,396,397 B1 | 5/2002 | Bos et al. | |
| 6,559,435 B2 | 5/2003 | Schofield et al. | |
| 6,734,904 B1 | 5/2004 | Boon et al. | |
| 6,803,946 B1 | 10/2004 | Wakiyama et al. | |
| 6,928,180 B2 * | 8/2005 | Stam et al. | 382/104 |
| 6,947,576 B2 | 9/2005 | Stam et al. | |
| 7,038,577 B2 | 5/2006 | Pawlicki et al. | |
| 7,194,347 B2 * | 3/2007 | Harumoto et al. | 701/45 |
| 7,583,182 B2 | 9/2009 | Wang et al. | |
| 7,724,962 B2 | 5/2010 | Zhu et al. | |
| 7,924,462 B2 * | 4/2011 | Nishio | 358/2.1 |
| 8,189,871 B2 * | 5/2012 | Camilleri et al. | 382/104 |
| 8,456,327 B2 * | 6/2013 | Bechtel et al. | 340/937 |
| 2006/0018512 A1 | 1/2006 | Stam et al. | |
| 2008/0046149 A1 | 2/2008 | Breed | |

OTHER PUBLICATIONS

Written Opinion with English translation from PCT/EP2008/007033 dated Jul. 28, 2009.

International Preliminary Report on Patentability with English translation from PCT/EP2008/007033 dated Jul. 28, 2009.

Acunzo, D. et al., Context-Adaptive Approach for Vehicle Detection Under Varying Lighting Conditions, Proceedings of the 2007 IEEE Intelligent Transportation Systems Conference, Seattle, Washington, Sep. 30-Oct. 3, 2007, pp. 654-660 (7 pages).

* cited by examiner

METHOD AND SYSTEM FOR EVALUATING BRIGHTNESS VALUES IN SENSOR IMAGES OF IMAGE-EVALUATING ADAPTIVE CRUISE CONTROL SYSTEMS, ESPECIALLY WITH RESPECT TO DAY/NIGHT DISTINCTION

CROSS REFERENCE TO RELATED APPLICATIONS

This application is a continuation of U.S. application Ser. No. 12/674,918 with an International Application filing date of Aug. 28, 2008, which is a US national phase entry of PCT/EP2008/007033 with an international Application filing date of Aug. 28, 2008, which claims the benefit of U.S. Provisional Application No. 60/966,719 having a filing date of Aug. 28, 2007, the entire disclosures of which are incorporated herein by reference.

PRIOR ART

The invention relates to a method and an arrangement for evaluating brightness values in sensor images of an image-evaluating environment recognition system, in particular with regard to distinguishing between day and night, such as is preferably used in driving assistance systems in motor vehicles, according to the precharacterizing clause of Method Claim 1 et seq. and the arrangement according to Claim 8 et seq., as well as to a computer program product according to Claim 11.

Such driving assistance systems are used to assist a driver of a motor vehicle in carrying out particular operations in road traffic and are already used for a wide variety of tasks. For example, DE 10 2004 017 890 A1 discloses that a so-called LIDAR radar sensor is used to detect a predefined area in the direction of travel ahead of the vehicle in terms of particular objects, and particular safety functions can be triggered in good time by means of corresponding evaluation of the sensor signals. Examples of such vision-based or image-based driving assistance systems which attempt to understand or interpret a roadway situation or a scene are sufficiently well-known lane-keeping assistants, lane departure warning assistants, collision warning assistants or the like.

These systems which are known per se can be used, for example, as part of adaptive cruise control and/or inter-vehicle distance control of a vehicle, wherein such a control process can then be carried out without intervention by the driver, a previously set driving speed and/or a previously set distance from a vehicle travelling ahead or from items and/or objects located in the direction of travel. This is generally done by correspondingly taking into account the environment of the vehicle and, if appropriate, further parameters, for example the weather conditions and visibility conditions. Such a control system is also often referred to as an adaptive cruise control system (ACC system). The ACC system must be flexible enough, in particular in respect of the increasing traffic density of the present time, in order to react suitably to all driving situations. This in turn requires a corresponding object-detection sensor system in order to supply the measurement data which are necessary for the control process in each driving situation.

For this purpose, camera images, video images or sensor images are also used in image-evaluating or else so-called vision-based driving assistance systems for environment detection and recognition, wherein, in the known systems, objects, obstacles, boundaries of roadways and lanes and distances therefrom are determined from the camera images. For the actual capturing of images, image sensors which are referred to as imagers are used in so-called vision-based environment detection systems, which image sensors then supply a camera image (also referred to as a sensor image) of the detected environment, the pixels or image areas of which can be evaluated in terms of intensity, contrast, colour or other parameters using corresponding data-processing means.

In this case, the sensor images of an identical scene or an identical roadway situation may have a different appearance depending on the external lighting. Environment recognition systems in video-based driving assistance systems which attempt to interpret the same scene or roadway situation with different lighting may therefore have problems dealing with these different conditions during evaluation. The different appearance on account of changed lighting often requires readjustment or adjustment of the control algorithms, parameters or presettings needed or used to understand or interpret the scene or roadway situation.

A particularly frequent example of a scene which has a different appearance depending on the lighting is a traffic situation with vehicles which travel with the vehicle lighting switched on at night and with the vehicle lighting switched off during the day. Recognition of other vehicles by a vehicle with an image-based driving assistance system may thus be made more difficult or impaired depending on the light conditions. Recognition of lane and/or roadway markings by an abovementioned driving assistance system or by the environment recognition system which interprets the scene or roadway situation may also be made more difficult or impaired during a change from day to night.

DISCLOSURE OF THE INVENTION

The invention is based on a method for evaluating sensor images of an image-evaluating environment recognition system on a carrier, for example a vehicle in road traffic, possibly taking into account the vehicle's own movement, in which, in order to distinguish the light conditions in the area of the image-evaluating environment recognition system with regard to day or night, at least the gain and/or the exposure time of the at least one image sensor detecting the environment is/are advantageously monitored according to the invention. A profile of the gain and/or the exposure time against time with relatively high gain or relatively long exposure times will characterize night-time light conditions, and a profile of the gain and/or the exposure time with relatively low gain and/or relatively short exposure times will characterize daytime light conditions. However, further additional information may also be used in this case to make a statement on a daytime or night-time state.

In order to determine a daytime or night-time state, it is thus possible to evaluate at least the profile of the gain and/or the exposure time of the image sensor in a predefined period of time by determining, for example, whether a significant part or a sufficiently large part of this profile corresponds to a daytime or night-time state.

The inventive method for determining a daytime or night-time state of a scene or roadway situation detected in a video-based or image-based manner using at least one image sensor therefore uses a different light intensity of the scene or roadway situation by day or by night to the effect that a statement on a daytime or night-time state can therefore be made in a simple manner.

The invention makes it possible to carry out an instantaneous daytime or night-time recognition process in regular cycles using the instantaneous gain and/or the instantaneous exposure time of the image sensor, a number of previous stored daytime or night-time recognition processes which may represent a profile that can be evaluated also being able to be evaluated in addition to the current or last daytime or night-time recognition process, said number corresponding to a predefinable period of time and the period of time on which the profile is based also being able to be variable. In this case, a sufficient number of previous daytime or night-time recognition processes which represent the profile or the development of the situation should be present in order to make a statement on a daytime or night-time state, which number can be gathered from the profile.

If there is no difference from a previously or recently made statement on a daytime or night-time state, for example because there is not a sufficient number of daytime or night-time recognition processes for a new decision, the previously or recently made statement preferably remains unchanged.

The profile or the temporal development may be determined by carrying out an instantaneous daytime or night-time recognition process in regular cycles using the instantaneous gain and/or the instantaneous exposure time of the image sensor, a number of previous daytime or night-time recognition processes being stored in addition to the current or last daytime or night-time recognition process, said number corresponding to a predefinable period of time.

If the period of time over which the profile is tracked or the number of stored previous daytime or night-time recognition processes is variable, for example in order to avoid having to imperatively resort to a long chain of previous night-time recognition processes after turning off a vehicle at night and when reusing the vehicle the next morning, an even better statement on a daytime or night-time state can be made.

The method according to the invention can also be extended by the fact that, in the event of an inconclusive assignment to a daytime or night-time state, a third setting which does not contribute to a conclusive statement on a daytime or night-time state is provided for the image sensor in the environment recognition system. An average value of the state recognition profile can be used to determine the third setting in order to determine a state lying between a daytime state and a night-time state, the average value being formed, in particular, in a fashion proportional to the profile or with the aid of a lookup table. The average value is preferably formed in a fashion proportional to the profile, for example proportional to the profile of the daytime or night-time recognition processes carried out.

This particularly advantageous refinement of the invention thus provides for an intermediate zone to correspond to a "neither daytime nor night-time state" of the image sensor. Currently, such a "neither daytime nor night-time state" initially results neither in a daytime recognition process nor in a night-time recognition process, that is to say the image sensor has in this case a gain and/or an exposure time which, if permanently maintained, would not result in any conclusive statement on a daytime or night-time state. As a result of the fact that a "neither daytime nor night-time state" is thus provided as a third setting, it is possible to avoid frequently changing over between determination of a daytime state and determination of a night-time state.

For example, for a profile with 40% daytime recognition, 50% night-time recognition and 10% "neither daytime nor night-time states", the parameters or presettings may be set or readjusted with a 50/90 share of the setting range between day and night. A proportionality which is not necessarily linear in this case may thus be formed between the brightness state of the environment and the parameter settings.

It is particularly advantageous if the environment detected using the environment recognition system according to the invention is searched for bright objects which indicate the headlights of another carrier and whose occurrence is then used as additional information. Additional environment-specific information may also be used to distinguish the daytime or night-time state, which environment-specific information includes, in particular, further indication objects which are recognized in a detected environment and whose different appearance by day or night is known. For example, reflectors fitted to the surface of the roadway shine brightly at night as a result of their highly reflective properties; they are almost invisible or dark during the day.

For this purpose, bright objects in the form of headlights, in particular on the front of a vehicle, may be determined in particular, the occurrence of which is then used as additional information. Such objects have, for example, a generally round or elliptical shape and occur in pairs. They are thus generally easy to identify during image evaluation.

In this case, it is likewise advantageous if the frequency with which the bright objects and/or further environment-specific information are/is found in the detected environment is determined, a connection being established between a night-time state and a predefined frequency of the occurrence of such objects in an environment. One example is vehicle lights which are seen more and more often at night, with the result that the quotient of the number of lights found and the number of vehicles found increases.

The area-specific knowledge thus preferably also includes particular indication objects which can be identified in an environment, for example objects which are used to delimit roadways and lanes and the appearance of which is known, or other patterns in the form of roadway or lane markings in the detected situations. These also differ by day and by night, for example some appear to be larger by night than by day.

The frequency of occurrence may in turn be included as additional information in a statement or decision on a daytime or night-time state. For example, a connection may be established between an increasing frequency of the occurrence or observation of indication objects with a known appearance at night in a scene or situation and a decision or statement tending towards a night-time state.

In the case of an advantageous arrangement for carrying out the method described above, the image-evaluating environment recognition system includes, as image sensor, an electronic camera which is fitted to a vehicle as a carrier and continuously records the front area (in the direction of travel) of the vehicle on a roadway in such a way that a sensor image constructed from pixels whose brightness values and, if appropriate, colour values image the environment is respectively present. There is also an evaluation unit which can be used to distinguish the light conditions in the area of the image-evaluating environment recognition system with regard to day or night on the basis of the gain and/or the exposure time of the at least one camera which records the environment.

In the case of such an arrangement, a signal from the determination of the daytime or night-time state, that is to say in particular parameters or presettings which can be used to set a video-based or image-based driving assistance system with regard to the daytime or night-time state, can then be applied to the evaluation unit in a simple manner. In this case, it is conceivable, for example, to set the parameters or presettings on a sliding scale in such a manner that the best performance of an environment recognition system which recognizes a situation in the environment is achieved in conjunction with a video-based or image-based driving assistance system.

In summary, the invention thus provides a method which makes it possible to classify a lighting situation as a daytime or night-time situation. This classification thus makes it possible to recognize a roadway situation without errors independently of the lighting state thereof.

The invention also proposes a computer program product which, stored on a computer-usable medium, comprises computer-readable program means which, in the event of the computer program product being executed on a microprocessor with associated storage means or on a computer, cause said microprocessor or computer to carry out the method according to the invention or to operate the arrangement.

BRIEF DESCRIPTION OF THE DRAWING

One exemplary embodiment of the invention is illustrated in the figures of the drawing and is explained below. In the drawing.

DESCRIPTION OF THE EXEMPLARY EMBODIMENT

Figure 1:
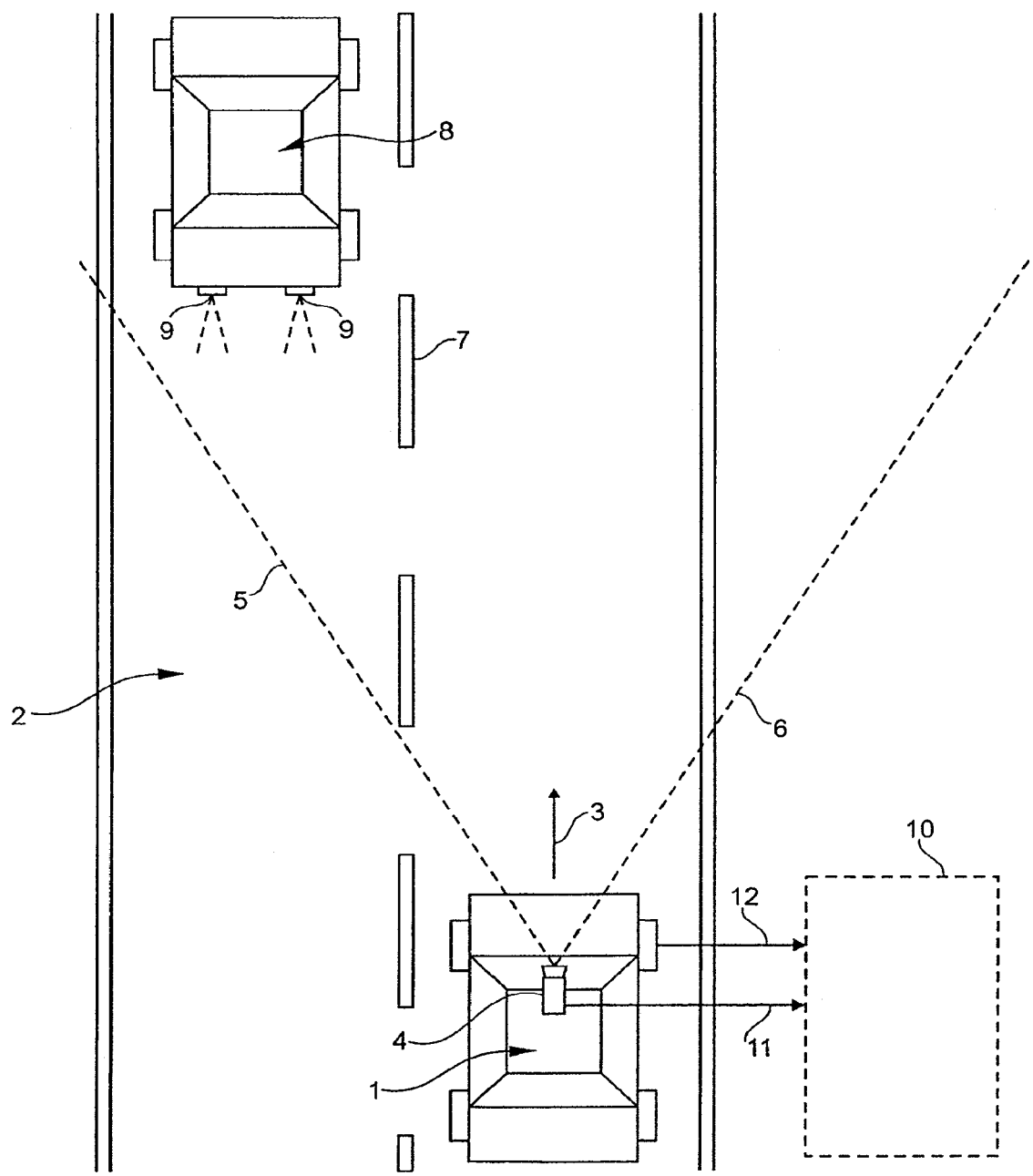
FIG. 1 shows a diagrammatic illustration of a vehicle having a camera as part of an environment recognition system for evaluating daytime and night-time states, additionally also using the headlights of another vehicle.

FIG. 1 diagrammatically reveals a situation of as vehicle 1 as a carrier of an environment recognition system which can move in this case on a roadway 2 in the direction of an arrow 3. The environment recognition system of the vehicle 1 has, as an image sensor, a camera 4, in particular a digital video camera, which records an area between dashed lines 5 and 6.

The roadway 2 is separated by a marking 7, and another vehicle 8 which is fitted with front headlights 9 approaches on the other side of the roadway. At an input 11, the digital data of the pixel-comprising sensor image from the camera 4 and additionally, for example at an input 12, also the current speed data of the vehicle 1 are evaluated in an evaluation device 10.

In order to distinguish the light conditions in the area of the image-evaluating environment recognition system on the vehicle 1 with regard to day or night, the gain and/or the exposure time of the camera 4 is/are monitored in the evaluation device 10 according to FIG. 1. In this case, a profile of the gain and/or the exposure time against time with relatively high gain or relatively long exposure times characterizes the night-time light conditions and a profile of the gain and/or the exposure time with relatively low gain and/or relatively short exposure times characterizes the daytime light conditions.

In this case, however, it is also possible to use further additional information to make a statement on a daytime or night-time state. The environment recorded with the camera 4 is searched for bright objects, the headlights 9 of the other vehicle 8 being used as additional information in the exemplary embodiment shown here. Furthermore, it is also possible to use additional environment-specific information (not explained in any more detail here) to distinguish the daytime or night-time state, which environment-specific information includes, in particular, further indication objects which are recognized in a detected environment and whose different appearance by day or night is known.

Figure 2:
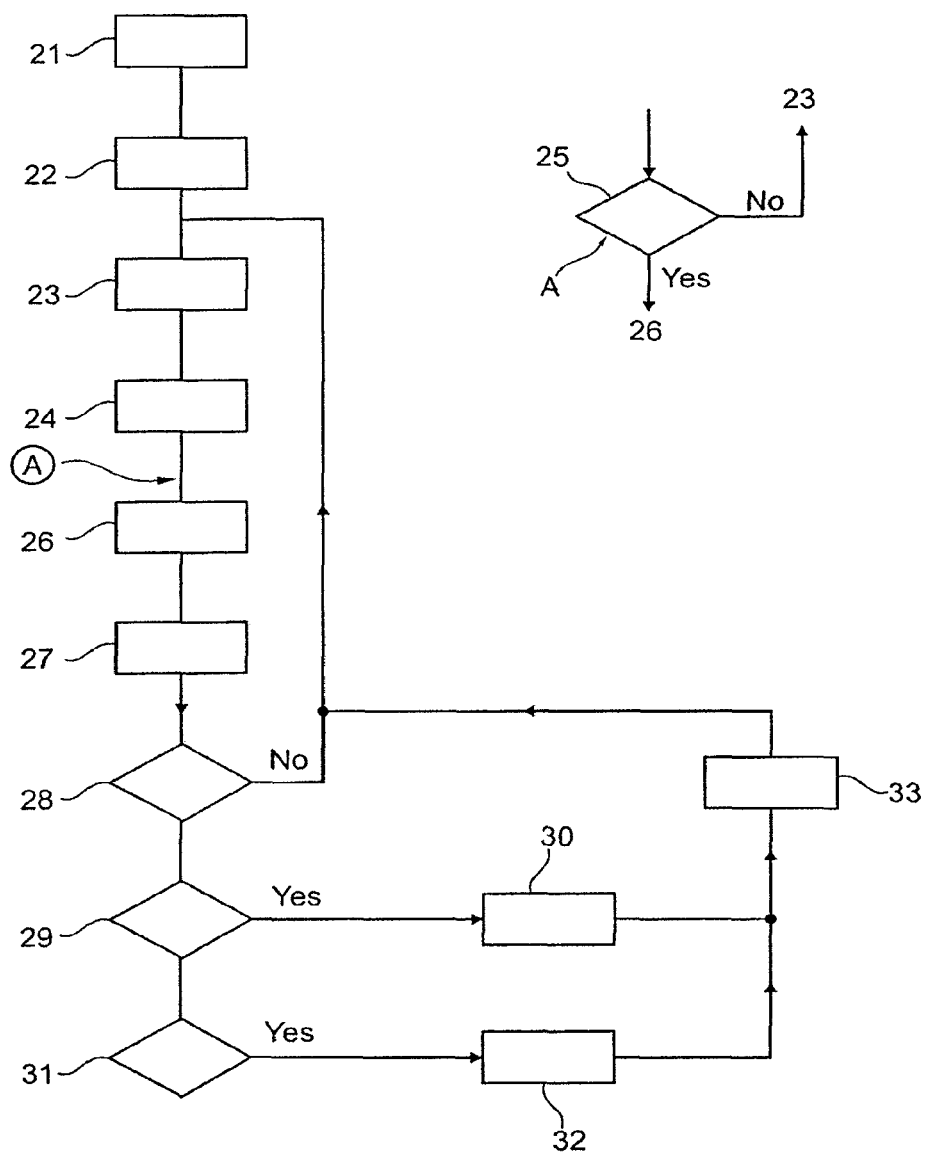
FIG. 2 shows a flowchart of the method features according to the invention in an evaluation unit of the environment recognition system.

In order to detect a different light intensity which allows a conclusion to be drawn on a daytime or night-time state, it is generally possible to proceed using the flowchart according to FIG. 2, essentially the following method steps which are then explained in detail using the flowchart according to FIG. 2 being carried out in the evaluation unit 10 in this case.

At least the gain and/or the exposure time of the camera 4 is/are monitored.

A profile or a development with consistently high gain or consistently long exposure times is used as an indication that it is currently night-time.

A profile or a development with consistently low gain or consistently short exposure times is used as an indication that it is currently daytime.

The profile or the development of the gain and/or the exposure times of the image sensor or similar settings is/are preferably evaluated and it is determined whether a significant part or a sufficiently large part of this profile or this development corresponds to a daytime or night-time state.

A profile or a development of the daytime and night-time decisions can subsequently then be stored, which profile or development can then be used to make a subsequent statement on a daytime or night-time state.

The profile (which can also be referred to as the history) or the temporal development can be determined, for example, by carrying out an instantaneous daytime or night-time recognition process in regular cycles using the instantaneous gain and/or the instantaneous exposure time of the image sensor. A number of previous daytime or night-time recognition processes which represent the profile or the development of the daytime or night-time recognition processes can be stored in addition to the current or last daytime or night-time recognition process, said number corresponding to a predefinable period of time.

The period of time may be variable, for example in order to avoid having to imperatively resort to a long chain of previous night-time recognition processes after turning off a vehicle at night and when reusing the vehicle the next morning, in order to make a statement on a daytime or night-time state.

In order to avoid frequently changing over between determination of a daytime state and determination of a night-time state, provision is preferably made of a "neither daytime nor night-time state" which corresponds to an intermediate zone and preferably provides neither daytime settings nor night-time settings for the image sensor. Currently, such a state initially results neither in a daytime recognition process nor in a night-time recognition process, that is to say the image sensor has a state, that is to say a gain and/or an exposure time, which state, if permanently maintained, would not result in any conclusive statement on a daytime or night-time state.

This "neither daytime nor night-time" state preferably also does not contribute to a conclusive statement on a daytime or night-time state.

A sufficient number, which can be gathered from the profile or the development for example, or a sufficient proportion, which corresponds to a percentage for example, of previous daytime or night-time recognition processes is preferably needed to make a statement on a daytime or night-time state.

If there is no difference from a previously or recently made statement on a daytime or night-time state, for example because there is not a sufficient number of daytime or night-time recognition processes for a new decision, the previous state is preferably retained or the previously or recently made statement preferably remains unchanged.

According to the invention, additional information may be used to make a statement or decision on a daytime or night-time state. For example, it is conceivable to search detected situations or scenes for bright objects in the form of headlights, as illustrated in FIG. 1. Objects in the form of headlights on the front of another vehicle 8 have, for example, a generally round or elliptical shape and occur in pairs and at approximately the same image height.

The frequency with which such objects are found in the detected situations or scenes which are searched can also be monitored. A connection is preferably established between an increasing frequency of the occurrence or observation of such objects in a scene or a situation and a decision or statement tending towards a night-time state.

Area-specific knowledge relating to how a scene or a situation has a different appearance by day and by night can also be used to make a statement or decision on a daytime or night-time state.

An example of such area-specific knowledge is the fact that particular objects, for example reflectors which are used, for example, to delimit roadways and lanes, appear larger by night than by day.

In this case, the frequency with which objects having such properties or such an appearance occur, for example, in a pattern in the form of roadway or lane markings can then be monitored. In this case too, a connection is preferably established between an increasing frequency of the occurrence or determination of such objects in a scene or in a situation and a decision or statement tending towards a night-time state.

The decision itself or the statement made need not necessarily be binary, that is to say does not necessarily need to have only two states, for example it is day or it is night. For example, an average value of the daytime or night-time recognition processes can be used, for example in a proportional manner, to set or readjust the rules or presettings of a video-based or image-based driving assistance system, which understands or interprets a situation or a scene, or the image recognition system thereof. For example, for a profile with 40% daytime recognition, 50% night-time recognition and 10% "neither daytime nor night-time states", the rules or presettings may be set or readjusted with a 50/90 share of the setting range between day and night.

Such setting or readjustment can also be carried out in a non-linear manner, for example with the aid of a lookup table.

A flowchart of the method according to the invention is now explained by way of example using FIG. 2.

The method starts in a first method step 21. A daytime state is set as the starting or initial value in a second method step 22. A so-called frame is recorded in a third method step 23, which frame contains at least the instantaneous gain and the instantaneous exposure time of at least the camera 4 according to FIG. 1, which records an environment as a roadway situation or scene, at least at the time at which the environment is detected in a video-based or image-based manner.

The gain and the exposure time of the at least one camera 4 are read from the frame in a fourth method step 24. In a fifth method step 25 (inserted under A after the method step 24), an enquiry may take place in order to determine whether a sufficiently fast movement has taken place since the last frame was recorded, for example in order to determine whether a sufficient distance on the roadway 2 has been traveled since then. If this is the case, the method proceeds with a sixth method step 26. If this is not the case, a new frame is recorded again in the third method step 23. However, the method according to the invention does not necessarily presuppose any movement of the carrier and thus of the camera 4; however, the vehicle's own movement is taken into account in the exemplary embodiment described here.

The sixth method step 26 clarifies whether the instantaneous exposure time and instantaneous gain stored in the recorded frame correspond to an instantaneous daytime state or a night-time state or a "neither daytime nor night-time state". The result is an instantaneous daytime or night-time recognition process or an instantaneous "neither daytime nor night-time state".

In a seventh method step 27, the knowledge obtained in the sixth method step 26 is added to a profile. In an eighth method step 28, an enquiry takes place in order to determine whether the profile has a sufficient length. If this is the case, the method continues with a ninth method step 29. If this is not the case, the method continues with the third method step 23.

In the ninth method step 29, an enquiry takes place in order to determine whether items of knowledge added to the profile in a sufficient number are night-time decisions. If this is the case, the method continues with a tenth method step 30. If this is not the case, the method continues with an eleventh method step 31.

In the tenth method step 30, the statement that a night-time state prevails is made. In the eleventh method step 31, an enquiry takes place in order to determine whether items of knowledge added to the profile in a sufficient number are daytime decisions. If this is the case, the method continues with a twelfth method step 32. If this is not the case, the method preferably continues with the third method step 23. In the twelfth method step 32, the statement that a daytime state prevails is made.

In a thirteenth method step 33 which follows the tenth and twelfth method steps 30, 32, the profile is erased and the method continues in the third method step 23 again.

It is important to emphasize that it is not the aim or objective of the invention to control lighting. Rather, the aim of the invention is to describe or classify a lighting situation of an environment, a scene or a roadway situation by monitoring the camera and incident or process statistics. A result obtained thereby in the form of the statement made is preferably used to set the rules, parameters or presettings of a video-based or image-based driving assistance system, which understands or interprets the environment, or the environment recognition system thereof, for example on a sliding scale, in such a manner that the best performance is achieved.

The invention is industrially applicable, in particular, in the field of the production and operation of video-based or image-based driving assistance systems or video-based or image-based video systems which can be used in road traffic. In this case, it is particularly advantageous and also provided for the driver assistance system to have a lane-keeping assistance system.

We claim:

1. A method for setting a parameter of an image-based driving assistance system on a vehicle, the driver assistance system including a lane-keeping assistance system, the method comprising:

creating a state recognition profile including a plurality of respective previous instantaneous gains and previous instantaneous exposure times associated with one of an instantaneous daytime state and an instantaneous night-time state;

recording a current frame;

reading at least one of a current instantaneous gain and a current instantaneous exposure time associated with the frame;

identifying, based on the state recognition profile, if the at least one of the current instantaneous gain and the current instantaneous exposure time correspond to one of the instantaneous daytime state, the instantaneous night-time state, and a neither daytime nor night-time state;

if the at least one of the current instantaneous gain and the current instantaneous exposure time correspond to one of the instantaneous daytime state and the instantaneous night-time state, adding the current instantaneous gain and the current instantaneous exposure time to the state recognition profile as an additional one of the previous instantaneous gains and previous instantaneous exposure times representing the one of the instantaneous daytime state and the instantaneous night-time state of the current instantaneous gain and the current instantaneous exposure time;

if the at least one of the current instantaneous gain and the current instantaneous exposure time correspond to one of the instantaneous daytime state and the instantaneous night-time state, setting a parameter of the driver assistance system based on the corresponding state of the current instantaneous gain and the current instantaneous exposure time; and if the at least one of the current instantaneous gain and the current instantaneous exposure time do not correspond to one of the instantaneous daytime state and the instantaneous night-time state, maintaining a current state of the parameter of the driver assistance system.

2. The method for setting a parameter of an image-based driving assistance system on a vehicle as set forth in claim 1, wherein the creating step includes:

repeating the recording step, the reading step, the identifying step, and the adding step until the state recognition profile includes a number of the respective previous instantaneous gains and previous instantaneous exposure times associated with one of the instantaneous daytime state and the instantaneous night-time state.

3. The method for setting a parameter of an image-based driving assistance system on a vehicle as set forth in claim 1, wherein:

repeating the recording step, the reading step, the identifying step, the adding step, the setting step, and the maintaining step in regular cycles.

4. The method for setting a parameter of an image-based driving assistance system on a vehicle as set forth in claim 1, wherein the identifying step includes:

comparing the current instantaneous gain and the current instantaneous exposure time with gains and exposure times in the state recognition profile; and identifying whether the current instantaneous gain and the current instantaneous exposure time correspond to one of the instantaneous daytime state, the instantaneous night-time state, and a neither daytime nor night-time state based on the comparison.

5. The method for setting a parameter of an image-based driving assistance system on a vehicle as set forth in claim 4, further including:

accessing the gains and exposure times in the state recognition profile via a lookup table.

6. The method for setting a parameter of an image-based driving assistance system on a vehicle as set forth in claim 1, further including:

determining respective average values of the gain and the exposure time for the state recognition profile.

7. The method for setting a parameter of an image-based driving assistance system on a vehicle as set forth in claim 6, wherein the identifying step includes:

identifying the current instantaneous gain and the current instantaneous exposure time corresponding to the neither daytime nor night-time state based on the respective average values of the gain and the exposure time for the state recognition profile.

8. The method for setting a parameter of an image-based driving assistance system on a vehicle as set forth in claim 1, further including:

determining a frequency with which bright objects and indication objects are found in a detected environment; and establishing a connection between the night-time state and a predefined frequency of the occurrence of the bright and indication objects in the environment.

9. An apparatus used within an image-evaluating environment recognition system on a vehicle having a driver assistance system, the driver assistance system including a lane-keeping assistance system having logic capable performing:

monitoring at least one of respective gains and exposure times of images detected by an image sensor distinguishing light conditions with regard to day and night;

sensing instantaneous images in regular cycles using at least one of the gain and the exposure time of the image sensor;

creating a state recognition profile by storing at least one of instantaneous gains and instantaneous exposures of respective previously identified daytime and night-time states of previous images;

determining one of a daytime state, a night-time state, and a neither daytime nor night-time state associated with the current image based on the previously stored instantaneous gains and instantaneous exposures;

if the state of the current image is determined as one of the daytime state and the nigh-time state, setting a parameter of the driver assistance system of the image-evaluating environment recognition system based on the state associated with the current image; and if the current image is associated with the neither daytime nor night-time state, maintaining a previously set state of the driver assistance system of the image-evaluating environment recognition system.

10. The apparatus as set forth in claim 9, having logic further capable of performing:

repeating the creating step until the state recognition profile includes a number of the instantaneous gains and instantaneous exposures of the images.

11. The apparatus as set forth in claim 10, having logic further capable of performing the setting step and the maintaining step only after the state recognition profile includes the number of the instantaneous gains and instantaneous exposures of the images.

12. The apparatus as set forth in claim 10, wherein the number of the instantaneous gains and instantaneous exposures of the images corresponds to a predefined period of time.

13. The apparatus as set forth in claim 9, wherein the determining step includes:

comparing the current instantaneous gain and the current instantaneous exposure time with gains and exposure times in the state recognition profile; and identifying whether the current instantaneous gain and the current instantaneous exposure time correspond to one of the instantaneous daytime state, the instantaneous night-time state, and a neither daytime nor night-time state based on the comparison.

14. The apparatus as set forth in claim 9, having logic further capable of performing:

determining respective average values of the gain and the exposure time for the state recognition profile.

15. The apparatus as set forth in claim 14, having logic further capable of performing:

identifying the current instantaneous gain and the current instantaneous exposure time corresponding to the neither daytime nor night-time state based on the respective average values of the gain and the exposure time for the state recognition profile.

16. An apparatus used within an image-evaluating environment recognition system on a vehicle having a driver assistance system, the driver assistance system including a lane-keeping assistance system, the apparatus including:
- means for creating a state recognition profile including a plurality of respective previous instantaneous gains and previous instantaneous exposure times associated with one of an instantaneous daytime state and an instantaneous night-time state;
- an image sensor recording a current frame;
- means for reading at least one of a current instantaneous gain and a current instantaneous exposure time associated with the frame;
- means for identifying, based on the state recognition profile, if the at least one of the current instantaneous gain and the current instantaneous exposure time correspond to one of the instantaneous daytime state, the instantaneous night-time state, and a neither daytime nor night-time state;
- if the at least one of the current instantaneous gain and the current instantaneous exposure time correspond to one of the instantaneous daytime state and the instantaneous night-time state, the current instantaneous gain and the current instantaneous exposure time are added to the state recognition profile as an additional one of the previous instantaneous gains and previous instantaneous exposure times representing the one of the instantaneous daytime state and the instantaneous night-time state of the current instantaneous gain and the current instantaneous exposure time;
- means for setting a parameter of the driver assistance system based on the corresponding state of the current instantaneous gain and the current instantaneous exposure time, if the at least one of the current instantaneous gain and the current instantaneous exposure time correspond to one of the instantaneous daytime state and the instantaneous night-time state; and
- if the at least one of the current instantaneous gain and the current instantaneous exposure lime do not correspond to one of the instantaneous daytime state and the instantaneous night-time state, the means for setting maintains a current state of the parameter of the driver assistance system.

17. The apparatus used within an image-evaluating environment recognition system on a vehicle as set forth in claim 16, wherein the means for identifying includes:
- means for comparing the current instantaneous gain and the current instantaneous exposure time with gains and exposure times in the state recognition profile; and
- means for determining whether the current instantaneous gain and the current instantaneous exposure time correspond to one of the instantaneous daytime state, the instantaneous night-time state, and a neither daytime nor night-time state based on the comparison.

18. The apparatus used within an image-evaluating environment recognition system on a vehicle as set forth in claim 17, further including:
- a look-up table storing the gains and exposure times of the state recognition profile.

19. The apparatus used within an image-evaluating environment recognition system on a vehicle as set forth in claim 17, further including:
- means for determining respective average values of the gain and the exposure time for the state recognition profile.

20. The apparatus used within an image-evaluating environment recognition system on a vehicle as set forth in claim 19, wherein:
- the means for comparing compares the current instantaneous gain and the current instantaneous exposure time to the respective average values of the gain and the exposure time.

\* \* \* \* \*